United States Patent
Ihara et al.

(10) Patent No.: US 8,309,886 B2
(45) Date of Patent: Nov. 13, 2012

(54) WELDING DEVICE AND SETTER OF THE SAME

(75) Inventors: Hideki Ihara, Hyogo (JP); Kazunori Matsumoto, Osaka (JP); Kouji Hamamoto, Hyogo (JP); Yoshiaki Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 532 days.

(21) Appl. No.: 12/598,046

(22) PCT Filed: Mar. 4, 2009

(86) PCT No.: PCT/JP2009/000971
§ 371 (c)(1),
(2), (4) Date: Oct. 29, 2009

(87) PCT Pub. No.: WO2009/122657
PCT Pub. Date: Oct. 8, 2009

(65) Prior Publication Data
US 2010/0065540 A1    Mar. 18, 2010

(30) Foreign Application Priority Data
Mar. 31, 2008    (JP) ................. 2008-091126

(51) Int. Cl.
*B23K 9/10*    (2006.01)
(52) U.S. Cl. .................................. 219/130.5
(58) Field of Classification Search ........... 219/130.5
See application file for complete search history.

(56) References Cited

U.S. PATENT DOCUMENTS

| | | | | |
|---|---|---|---|---|
| 5,834,732 A * | 11/1998 | Innami et al. | ............ | 219/130.51 |
| 6,327,516 B1 * | 12/2001 | Zenke | ............ | 700/245 |
| 7,002,103 B2 * | 2/2006 | Holverson et al. | ......... | 219/130.5 |
| 2006/0175314 A1 * | 8/2006 | Hayes | ............ | 219/130.5 |
| 2009/0152251 A1 * | 6/2009 | Dantinne et al. | ............ | 219/125.1 |

FOREIGN PATENT DOCUMENTS

| | | |
|---|---|---|
| JP | 60-068169 A | 4/1985 |
| JP | 10-109166 A | 4/1998 |
| JP | 11-047950 A | 2/1999 |
| JP | 11047950 | 2/1999 |
| JP | 2007-222883 A | 9/2007 |
| JP | 2007222883 | 9/2007 |

OTHER PUBLICATIONS

Japanese Search Report for Application No. PCT/JP2009/000971 (with English translation of Form PCT/ISA/210), Apr. 14, 2009, Panasonic Corporation.

* cited by examiner

*Primary Examiner* — Huan Hoang
*Assistant Examiner* — Min Huang
(74) *Attorney, Agent, or Firm* — RatnerPrestia (57) ABSTRACT

Setter transmits information of an instruction that changes a content of a welding condition item to welder power supply, which then selects a content of the welding condition item from welding-condition-item memory & selector based on the information. At the same time, welder power supply selects data of the welding condition, which data corresponds to the content selected, and then transmits the selected content to setter, which displays the content on display section. The foregoing structure allows setter to set a content of a welding condition item for welder power supply without modifying or replacing setter presently used.

10 Claims, 8 Drawing Sheets

WELDING DEVICE AND SETTER OF THE SAME

This application is a U.S. national phase application OF PCT international application PCT/JP2009/000971.

TECHNICAL FIELD

The present invention relates to a welding device and a setter for setting welding conditions of the welding device.

BACKGROUND ART

A conventional welding device comprises a welder power supply for powering a welder that performs arc-welding or the like, and a setter for setting a welding condition of the welder power supply through remote operation. The setter is assigned individually to a specific welder power supply, and allows setting and displaying only predetermined welding conditions as well as powering conditions performable by the welder power supply.

Figure 11:
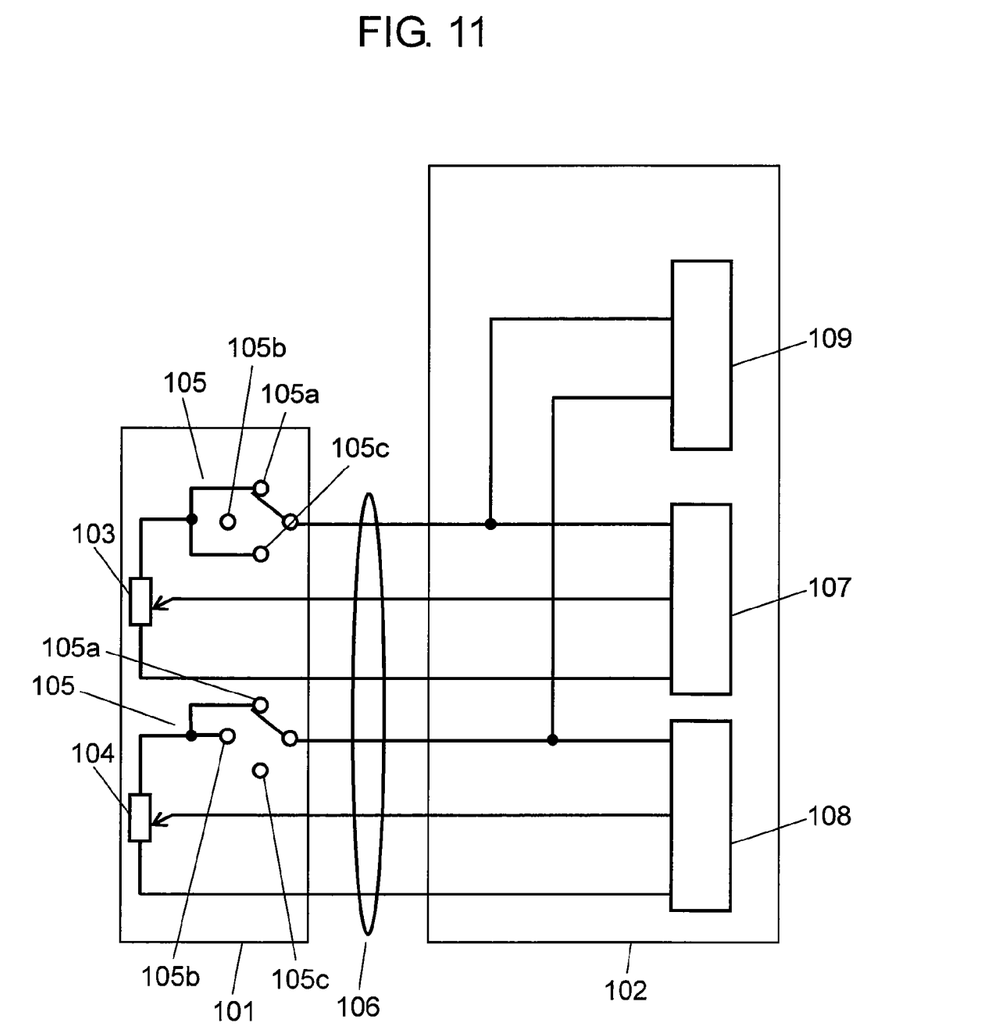
FIG. 11 shows a schematic diagram of a setter and a welder power supply of a conventional welding device.

The conventional welding device disclosed in Patent Literature 1 is described hereinafter with reference to FIG. 11, which depicts schematically a structure of the conventional welding device. FIG. 11 shows setter 101 and welder power supply 102 of the welding device, and omits other sections of a welder such as a weld-output section necessary for arc welding.

In FIG. 11 setter 101 is formed of current adjuster 103 for adjusting a welding current, voltage adjuster 104 for adjusting a welding voltage, and welding-method switcher 105 which switches a welding method from one to another. Two switchers 105 shown in FIG. 11 work together as a unit. Welder power supply 102 includes current control circuit 107 to which a signal from current adjuster 103 is supplied, voltage control circuit 108 to which a signal from voltage adjuster 104 is supplied, and switching circuit 109 to which a signal from switcher 105 is supplied. The welding method includes, e.g. $Co_2$ automatic arc welding method, arc gouging method, and manual welding method. These methods can be switched from one to another with switcher 105. Setter 101 is coupled to welder power supply 102 with cable 106, and carries out setting or changing a welding method, welding current, and welding voltage.

The length of cable 106 between setter 101 and welder power supply 102 is several meters or sometimes 10-odd meters, so that a user can change a content set in welder power supply 102 through remote operation.

Before starting a welding, it is necessary to set welding conditions to welder power supply 102 according to the characteristics of a target object which is to be welded. The welding conditions chiefly include, e.g. a welding method, welding current, welding voltage. Use of conventional welder power supply 102 and setter 101 needs to switch welding-method switcher 105 for switching the welding method from one to another. In this case, when switcher 105 selects contact 105a, welding-method switching circuit 109 determines to use the $Co_2$ automatic arc welding method. In a similar way, selection of contact 105b prompts switching circuit 109 to determine to adopt the arc gouging method, and selection of contact 105c prompts switching circuit 109 to adopt the manual welding method. The conventional welding device thus switches the welding method from one to another among the foregoing three methods with a switching signal transmitted from setter 101.

However, if a welding method other than the foregoing three methods is added to welder power supply 102 through altering a software program for welding, conventional setter 101 cannot select this additional method because welding-method switcher 105 has no contact corresponding to this additional method.

The welding conditions include, other than the welding method, a welding wire diameter, a base material of the target object, a control method. When the conventional welding device changes these conditions or adds a new condition, other than the welding method, through altering the software program for welding, the foregoing reason prohibits the welding device from selecting these conditions changed or added because setter 101 is assigned to specific welder power supply 102 individually.

To overcome this problem, it is possible to increase the number of contacts in switcher 105 of setter 101; however, this measures needs to modify setter 101, and setter 101 having a greater number of contacts must expressly replace conventional setter 101 which has been used before a welding condition is added.

On top of that, the problem discussed above can also happen when a welding output capacity of power supply 102 is changed. In this case, instead of modifying or replacing setter 101, it is possible to use a variable resistor (not shown) provided to conventional setter 101 for adjusting the current or the voltage in order to comply with the change in the welding output. However, although the variable resistor is kept at the same voltage as before the capacity of power supply 102 is changed, an actual current or voltage supplied from the changed power supply 102 differs from what is expected.

As discussed above, when another welding method is added to welder power supply 102 or an output capacity of power supply 102 is changed, the conventional welding device cannot use setter 101 anymore, which has been used before these changes with power supply 102. In other words, since setter 101 is assigned to specific welder power supply 102 individually, if another welding condition is added to power supply 102 or a capacity of power supply 102 is changed, setter 101 must be replaced or modified in order to comply with the new conditions.

Patent Literature 1: Unexamined Japanese Patent Application Publication No. H10-109166

DISCLOSURE OF INVENTION

The present invention aims to provide a welding device and a setter of the welding device, which setter can be still used together with a welder power supply without modifying or replacing the setter, although a welding condition is added to the power supply or the welder power supply per se is replaced with another one.

The welding device of the present invention comprises a welder power supply and a setter that sets a welding condition to the power supply. The setter includes the following structural elements:

a change instruction input section for inputting an instruction that changes a content of each item of the welding condition;

a setter data transmitter for transmitting the change instruction supplied by the change instruction input section to the welder power supply;

a welder power-supply data receiver for receiving the information, transmitted from the welder power supply, about the content of an item of the welding condition; and a display section for displaying the content of an item of the welding condition based on the information, received by the welder power-supply data receiver, about the content of the item of the welding condition.

The welder power supply comprises the following structural elements:

a setter data receiver for receiving the change instruction transmitted from the setter;

a welding-condition-item memory & selector for storing the information about the contents of multiple items of the welding condition and selecting one of the contents of the items based on the change instruction received by the setter data receiver; and a welder power-supply data transmitter for transmitting the information about the content of the welding condition item, which content is selected by the welding-condition-item memory & selector.

The display section of the setter displays the content of the welding condition item, which content is selected by the welding-condition-item memory & selector.

The structure discussed above allows setting with ease the welding condition including, e.g. a welding method, without modifying or replacing the setter even if a welding condition is added or the present welding condition is altered in the welder power supply.

REFERENCE SIGNS LIST 1 setter
2 setter data transmitter
3 welder power-supply data receiver
4 displayable data converter
5 display section
5a display for base material
5b display for wire diameter
6 switch-input section
6a switch-input section for base material
6b switch-input section for wire diameter
6c switch-input section for welding method
7 switch data converter
8 welder power supply
9 setter-data receiver
10 welder power-supply data transmitter
11 welding-condition-item memory & selector
12 welding condition selector
13 welding condition memory
14 LCD section
14a LCD assigned to base material
14b LCD assigned to wire diameter
14c LCD assigned to welding condition
15 function memory
16 dot-matrix display section
16a waveform display area
16b element display area
17 current/voltage display section
18 current/voltage changing section
19 converter for converting an amount to be changed from a current/voltage into data
20 current/voltage memory
21 current/voltage determiner
22 function selector
51 16 segments

DESCRIPTION OF EMBODIMENTS

Exemplary Embodiment 1

Figure 1:
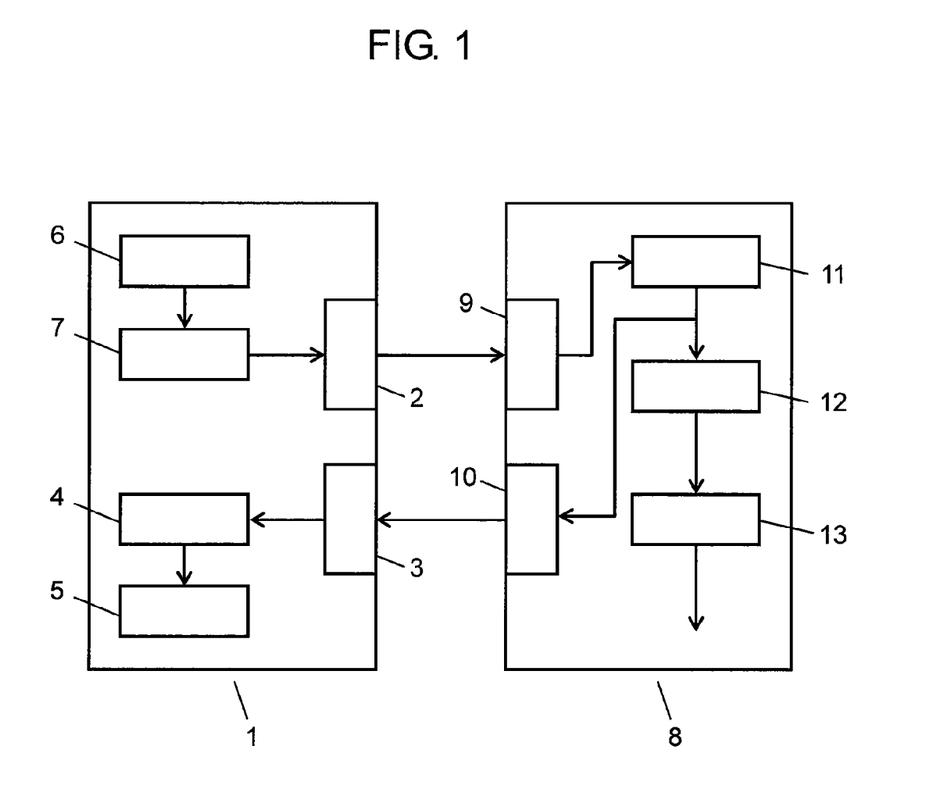
FIG. 1 shows a schematic diagram of a setter and a welder power supply of a welding device in accordance with a first embodiment of the present invention.

The first embodiment of the present invention is demonstrated hereinafter with reference to FIG. 1-FIG. 3. FIG. 1 shows a schematic diagram of a setter and a welder power supply of a welding device in accordance with the first embodiment of the present invention. Setter 1 and welder power supply 8 are focused among other structural elements hereinafter. A welding output section in the case of arc welding of a welder is a known technique, so that the description thereof is omitted here. Setter 1 is independent of welder power supply 8, and they communicate information to each other by wire or radio.

Setter 1 includes the following elements:

Setter data transmitter 2 for transmitting the information about setter 1 to welder power supply 8;

welder power-supply data receiver 3 for receiving the information about welder power supply 8;

display section 5 for displaying a content of a welding condition item;

displayable data converter 4 for converting the data, which is one of the information received by welder power-supply receiver 3, into letters and signs to be displayed on display section 5;

switch-input section 6, i.e. change instruction input section, for inputting an instruction that changes a content of a welding condition item; and switch-data converter 7 for converting an on-off signal, i.e. change instructing information supplied to switch-input section 6, of the switch into a switch data to be transmittable from setter-data transmitter 2.

Switch-input section 6 is, e.g. a push-button switch, and the on-off signal of the switch refers to a signal produced during a period from the press of push-button switch to the release of the switch.

Welder power supply 8 includes the following elements:

setter data receiver 9 for receiving the information transmitted from setter 1, about setter 1;

welder power-supply data transmitter 10 for transmitting the information about welder power supply 8 to setter 1; and welding-condition-item memory & selector 11 for storing multiple contents of a welding condition item and selecting one of the contents of the welding-condition item based on the change instructing information supplied from switch-input section 6 and transmitted from setter 1;

welding condition memory 13 for storing a welding condition corresponding to the content of the welding condition item; and welding condition selector 12 for selecting the welding condition data stored in welding condition memory 13.

The selected content of the welding condition item is transmitted as data to be displayed from welder power-supply data transmitter 10 to setter 1, and used when display section 5 of setter 1 displays the content of the welding condition item. The welding condition data stored memory 13 corresponds to the content of each item of the welding condition performable by welder power supply 8.

In this first embodiment, the items of welding condition include, e.g. a welding method, a diameter of welding wire, base material of a target object to be welded, a control method, a welding current, a welding voltage. The first embodiment focuses on the welding method, so that this embodiment counts only one item as the welding condition item, and welding-condition-item memory & selector 11 stores only the contents about the welding method. In the case of the welding condition item referring to the welding methods, the contents include, e.g. $Co_2$ automatic arc welding, semi-automatic arc welding, arc gouging, manual welding. In this embodiment, metal active gas (MAG) welding and metal inert gas (MIG) welding are taken as examples of the methods of semi-automatic welding. Welding condition memory 13 thus stores specific numerical data of MAG welding and MIG welding. To be more specific, the numerical data relates to welding waveform parameters, which includes, e.g. rising time of current waveform, of MAG welding and MIG welding actually performable by welder power supply 8.

In the case that the welding condition item refers to the diameter of welding wire, specific numerals of the wire diameter such as 1.0 mm, 1.2 mm, are stored in welding-condition-item memory & selector 11. In this case, the welding condition data stored in welding condition memory 13 includes, e.g. welding waveform parameters for welding the target object with the welding wires having the foregoing diameters.

In the case that the welding condition item refers to the base material, material names such as aluminum, soft steel are stored in memory & selector 11. In this case, welding condition memory 13 stores, e.g. welding waveform parameters for welding the foregoing base materials with a welding wire.

Setter 1 exchanges information with welder power supply 8 at setter data transmitter 2 and welder power-supply data receiver 3, while welder power supply 8 exchanges information with setter 1 at setter data receiver 9 and welder power-supply data transmitter 10.

The operation of the welding device formed of welder power supply 8 and setter 1, in accordance with the first embodiment of the present invention, is demonstrated hereinafter. First, welder power supply 8 and setter 1 are coupled together or set to be communicable with each other, then a starting switch (not shown) of welder power supply 8 is turned on, which prompts power supply 8 to transmit the content of the most typical item of a welding condition to setter 1 from welder power-supply data transmitter 10. For instance, welding-condition-item memory & selector 11 stores the information about MAG welding and MIG welding in this order as the contents of the welding method, i.e. as the contents of the item of the welding condition. Then the content of the welding method firstly stored is transmitted to setter 1 as the content to be displayed. Therefore, in this embodiment, when the starting switch is turned on, the information about MAG welding is transmitted as the data to be displayed to setter 1 from welder power-supply data transmitter 10.

Setter 1 receives this data about MAG welding at welder power-supply data receiver 3. Displayable data converter 4 converts this data received at data receiver 3 so that the data can be displayed as "MAG" indicating the content of the welding condition item on display section 5.

Figure 2A:
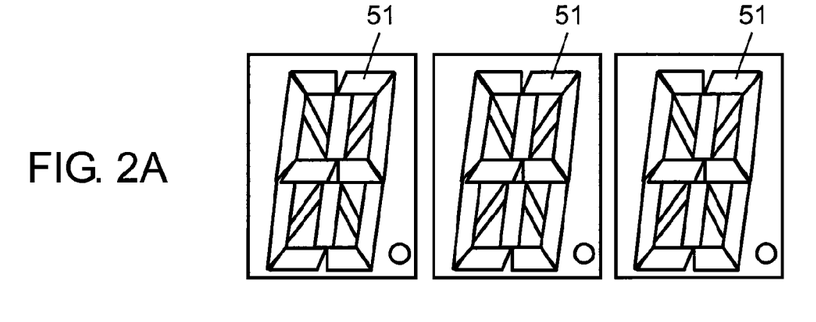
FIG. 2A illustrates a structure of a display section of the setter shown in FIG. 1.
Figure 2B:
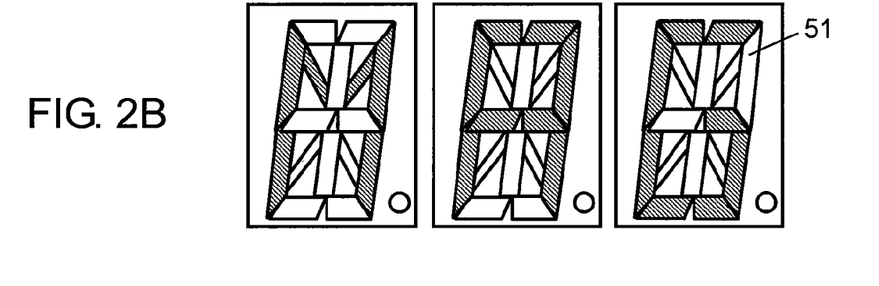
FIG. 2B shows a display example displayed on the display section of the setter.
Figure 2C:
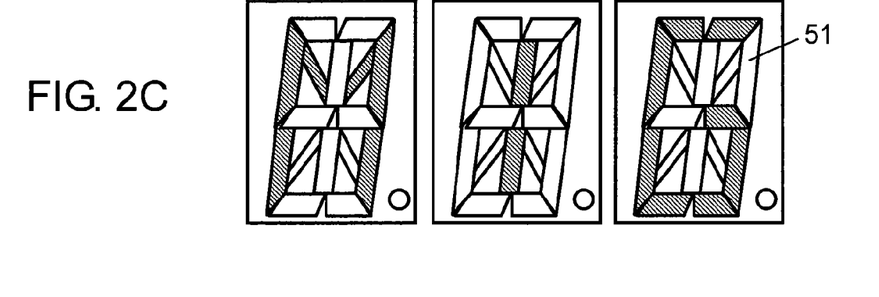
FIG. 2C shows another display example displayed on the display section of the setter.

In this embodiment, LED 51 having 16 segments for one letter as shown in FIG. 2A is used in display section 5. FIGS. 2B and 2C show instances of displays with LEDs 51 of display section 5. The turn-on of the starting switch allows displaying "MAG" indicating a welding method as shown in FIG. 2B. If welding-condition-item memory & selector 11 stores MIG welding in the first place, the turn-on of the starting switch allows displaying "MIG" indicating a welding method as shown in FIG. 2C.

In this embodiment, it is so prepared that the turn-on of the starting switch should display the content of the welding condition item that is firstly stored in welding-condition-item memory & selector 11; however, the present invention is not limited to this preparation. For instance, the content of the welding condition item used last time can be displayed, or a content of some predetermined item can be always displayed, or the content of welding condition item most frequently used in the past can be displayed.

Next, in FIG. 1, an on-off signal for a switch is supplied from switch-input section 6 of setter 1, and this on-off signal is converted by switch data converter 7 into the switch-data transmittable to welder power supply 8. This converted switch data is transmitted to welder power supply 8 from setter data transmitter 2. The on-off signal is thus eventually transmitted to power supply 8. Welder power supply 8 receives this on-off signal at setter data receiver 9, and advances an index by one step as shown in FIG. 3 based on the on-off signal, i.e. switch data, in welding-condition-item memory & selector 11. In other words, welding-condition-item memory & selector 11 stores the contents of respective welding-condition items together with the indexes corresponding to the contents, and the index is advanced one by one in response to each on-off signal. As shown in FIG. 3, memory & selector 11 stores six contents (W1-W6) of welding methods. In this case, the contents from W1 to W6 are sequentially designated by an operator based on the number of on-off signals. After W6 is designated, the procedure returns to the designation of W1 again, and repeats the same operation.

In FIG. 1, when memory & selector 11 is instructed to select one of the contents of the welding condition, welding condition selector 12 searches welding condition memory 13 for the actual welding condition data corresponding to the selected content. Memory 13 has stored the specific welding condition data, which correspond to the contents of the item stored in memory & selector 11 and are performable by welder power supply 8. A selection of one of the contents of the welding condition item by memory & selector 11 thus allows searching memory 13 for the welding condition data corresponding to the selected content. The welding condition data searched from welding condition memory 13 is used as the data for carrying out the welding by welder power supply 8 as well as by the welder. The content selected by memory & selector 11 is transmitted from welder power-supply data transmitter 10 to setter 1 as the data to be displayed. Setter 1 receives the data to be displayed at welder power-supply data receiver 3, and displayable data converter 4 converts the data so that the content of welding condition item can be displayed on display section 5.

Figure 3:
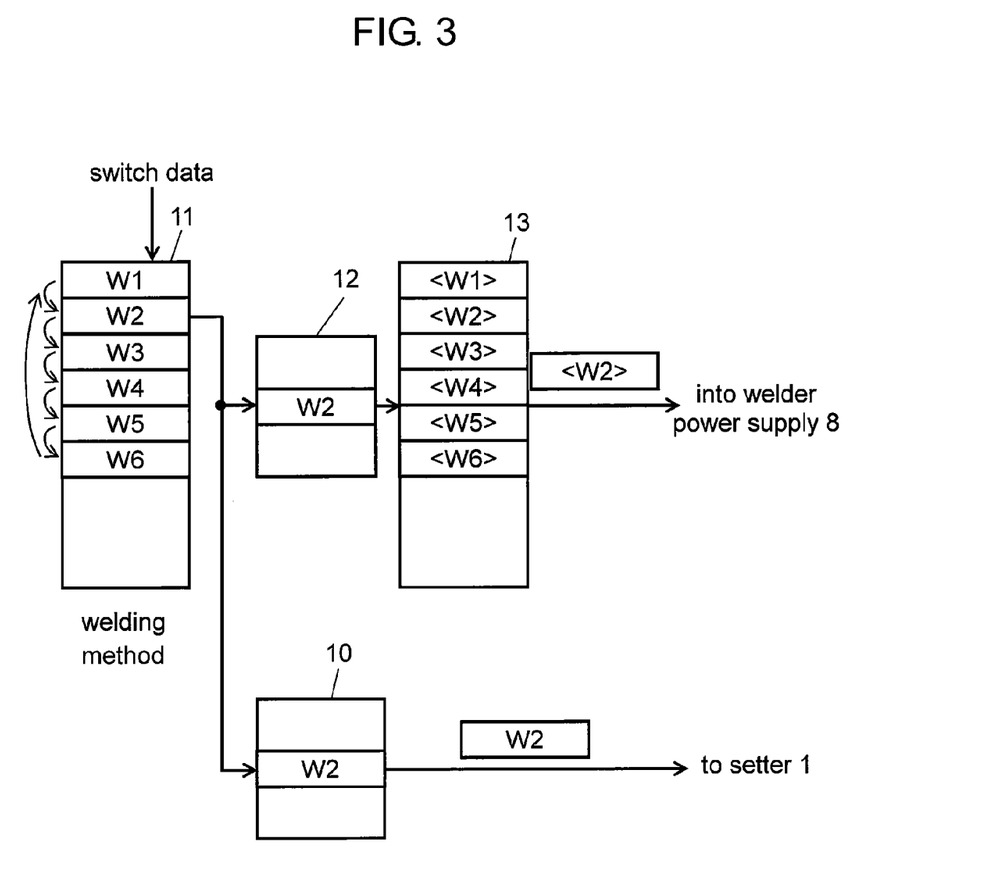
FIG. 3 shows a flow of selecting a welding condition of the welding device.

FIG. 3 shows that the switch data produced by one on-off signal is transmitted to welding-condition-item memory & selector 11, and then content W2 is selected. Content W2 is supplied to welding condition selector 12, and welding condition data <W2> corresponding to the selected content is searched from welding condition memory 13 in response to the content, supplied to selector 12, of the welding-condition item. Data <W2> corresponding to content W2 is used as welding condition data for the welding to be done by welder power supply 8 and the welder. FIG. 3 also shows that content W2 selected by memory & selector 11 is transmitted from welder power-supply data transmitter 10 as the data to be displayed on display section 5 of setter 1.

In this embodiment, welder power supply 8 can select either one of MAG welding or MIG welding as a welding method, i.e. the content of the welding condition item. Welding-condition-item memory & selector 11 thus stores MAG welding method and MIG welding method corresponding to indexes in this order. The indexes can be advanced by each on-off operation of the switch, so that each one of on-off operation of the switch done by switch-input section 6 instructs MAG welding at first, then instructs MIG welding, and instructs again MAG welding. The operation repeats this procedure. Each on-off operation advances the index from MAG welding to MIG welding, and the selection of MIG welding allows inputting MIG welding as the content of welding-condition item into welding condition selector 12, which then searches welding condition memory 13 for the welding condition data about MIG welding based on the content selected. Welder power supply 8 carries out MIG welding based on the welding condition data searched. MIG welding as the content of welding-condition item is transmitted from welder power-supply data transmitter 10 to setter 1 as the data to be displayed.

When a content of a welding-condition item should be added to the foregoing welding device in accordance with this embodiment, the content of the welding-condition item is added, in the first place, to memory & selector 11 of welder power supply 8. Then the welding condition data corresponding to the added content is stored to welding condition memory 13. Only these two steps allow setter 1 to set the welding condition in welder power supply 8. When a content of welding-condition item should be changed, the content of the welding-condition item to be changed and stored in memory & selector 11 is changed firstly, then the welding condition data stored in memory 13 and corresponding to the content to be changed is changed. Only these two steps allow setter 1 to change the welding condition of welder power supply 8. In other words, setter 1 only has a function of instructing a change in the contents of a welding-condition item. This structure allows, without any modification in setter 1, supplying a change instruction from switch-input section 6 and displaying the content of the alteration on display section 5, thereby selecting the welding condition added or changed. The present invention thus allows setting a content of a welding-condition item without modifying or replacing the existing setter 1 when the content of welding-condition item of welder power supply 8 should be added or changed.

When a new welder power supply is employed, it is not needed to scrap or replace the setter which has been used together with the preceding welder power supply. The present invention thus contributes to resource saving.

The communication between setter 1 and welder power supply 8 is not limited to this embodiment, but any communication method can be used, such as, various serial communications, parallel communications, wire communication, infrared communication, radio communication. In such a case, a transmitter and a receiver of setter and welder power supply 8 should comply with respective communication methods.

Exemplary Embodiment 2

The second embodiment demonstrates a case where multiple items of the welding conditions are selected, while the previous first embodiment describes a case where the welding condition item refers to only the welding method. The second embodiment differs from the first one in the number of display sections 5 and switch-input sections 6 of setter 1, for the number of items of welding conditions requires the same number of display sections 5 and switch-input sections 6.

Figure 4:
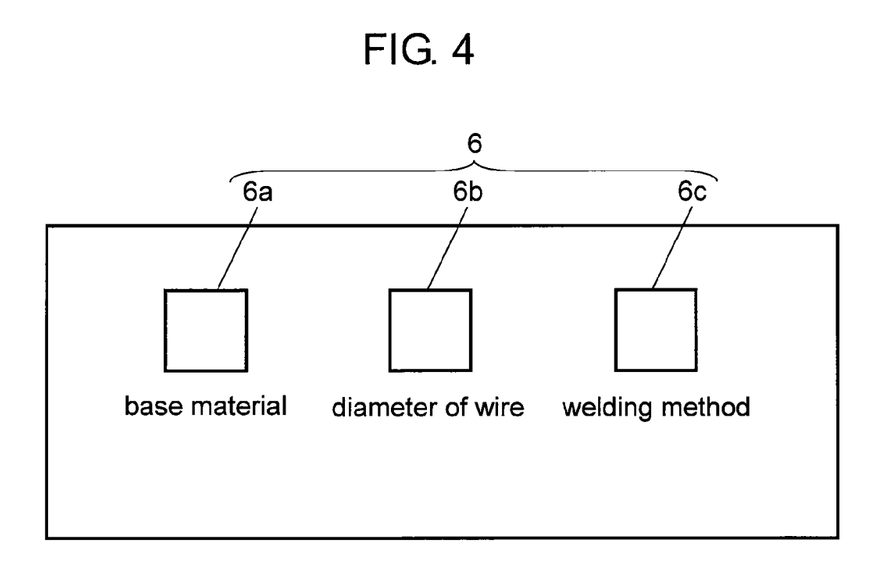
FIG. 4 shows a switch-input section of a setter of a welding device in accordance with a second embodiment of the present invention.
Figure 5:
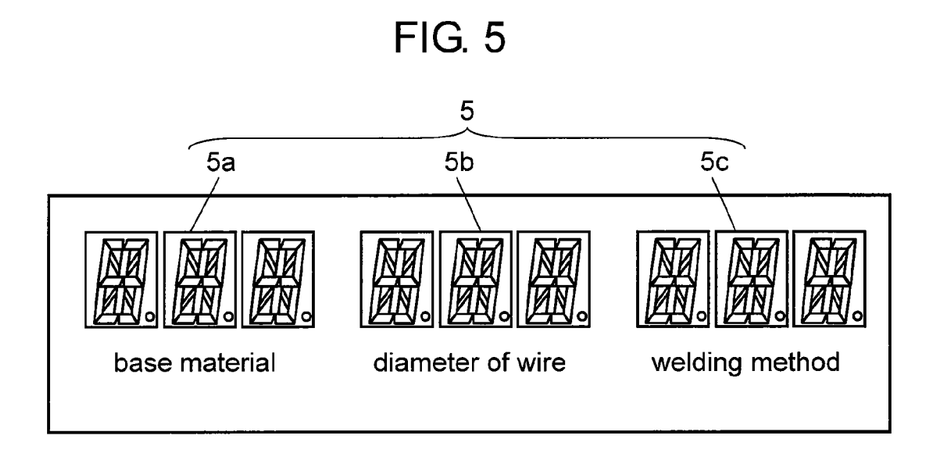
FIG. 5 shows a display section of the setter in accordance with the second embodiment.

The second embodiment allows setting three items of a welding condition, namely, base material of a target object, a diameter of a welding wire, and a welding method. As shown in FIG. 4, switch-input section 6 is formed of input section 6a for a base material, input section 6b for a diameter of welding wire, and input section 6c for a welding method. As shown in FIG. 5, display section 5 is formed of display section 5a for the base material, display section 5b for the diameter of welding wire, and display section 5c for the welding method. Operating respective switch input sections 6a, 6b, and 6c prompts corresponding display sections 5a, 5b, and 5c to display the contents of the respective items.

To be more specific, an change instruction for a content of an item is supplied from switch-input section 6, and then the content of welding-condition-item memory & selector 11 is selected. The content selected is transmitted to setter 1 as the data to be displayed. Display section 5 of setter 1 displays the content corresponding to the input supplied from input section 6. In the case that multiple change instructions supplied from input section 6 form a combination which is stored in welding condition memory 13 and is performable by welder power supply 8, selected multiple welding conditions are settable. Therefore, if contents of welding condition items are changed or added to welder power supply 8, the welding conditions changed or added can be selected without modifying or replacing setter 1 as the first embodiment does.

However, in this second embodiment, when the combination of the contents of welding condition items selected by switch-input section 6 is not performable by welder power supply 8 and the combination does not exist in welding condition memory 13 as the performable condition, a warning is displayed in setter 1. This mechanism is detailed hereinafter with reference to FIG. 6.

Figure 6:
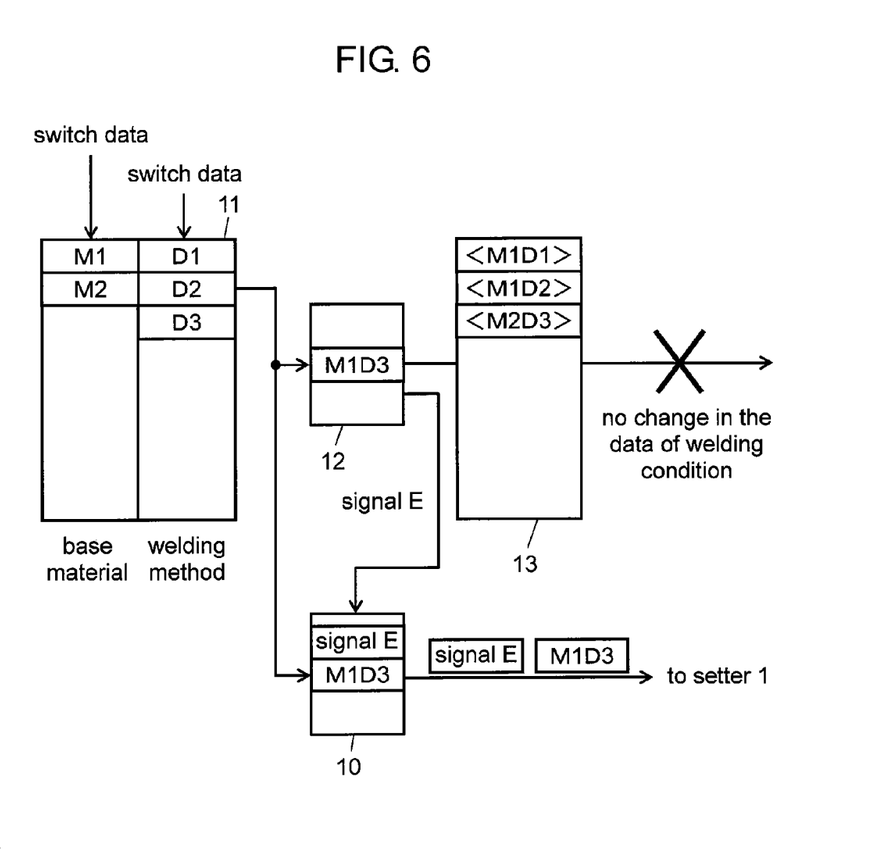
FIG. 6 shows a flow of welding-condition items of the welding device in accordance with the second embodiment.

FIG. 6 shows a flowchart illustrating the operation of the second embodiment, where two items of welding condition can be set, namely, a base material and a welding method. Each item includes some contents, e.g. the item of base material includes M1 and M2, and the item of welding method includes D1, D2, and D3. Welding condition memory 13, however, stores only the following three combinations of welding condition data, which are performable by welder power supply 8: The first welding condition data is <M1D1>, namely, base material M1 in combination with welding method D1. The second data is <M1D2>, and the third data is <M2D3>.

Welding-condition-item memory & selector 11 selects content M1 which is designated by switch-input section 6a assigned to the base material, and also selects content D3 which is designated by switch-input section 6c assigned to the welding method. In such a case, the content combination <M1D3> of welding condition item, i.e. content M1 in combination with content D3, is set in welding condition selector 12, which then searches welding condition memory 13 for the content combination <M1D3>; however, memory 13 does not store the welding condition data corresponding to the content combination <M1D3>, so that the welding condition data cannot be changed, but a warning signal, namely, signal E, is sent to welder power-supply data transmitter 10, which then transmits signal E together with a signal indicating the combination of M1D3 to welder power-supply data receiver 3 of setter 1. In other words, welding condition selector 12 transmits the signal (warning information) to setter 1 for informing that the combination of selected contents of the items, i.e. M1D3, does not exist. This signal is accompanied by the data indicating the content to be displayed.

For instance, assume that selector 11 stores M1 representing aluminum and M2 representing iron as contents of the welding condition item performable by welder power supply 8, and also stores D1 representing $CO_2$ welding method, D2 representing MIG welding method, and D3 representing MAG welding method. First, operate the switch-input section 6a assigned to base material for selecting aluminum M1, and operate the switch-input section 6c assigned to welding method for selecting MAG welding D3. In this case, assume that welding condition memory 13 does not store the combination of M1D3 as welding condition data, i.e. the data shows that the aluminum is to be welded with the MAG welding method, then welding condition selector 12 of welder power supply 8 transmits aluminum M1 and MAG welding D3, as the data to be displayed, to setter 1 together with signal E (warning information) for informing setter 1 that this combination does not exist. Since welding condition memory 13 does not store combination M1D3, i.e. aluminum (M1) is to be welded with MAG welding method (D3), the welding condition data in welder power supply 8 cannot be changed. Reception of signal E at setter 1 prompts display section 5 to blink "MAG" for informing an operator of a wrong combination of the contents.

Other methods than the blinking for informing the operator of a wrong combination are available, for instance, displaying in red (warning color) on display section 5, reversing display, or adding "E" to warn the operator of a wrong combination. In other words, a display different from a regular one can be used for the warning.

Figure 7:
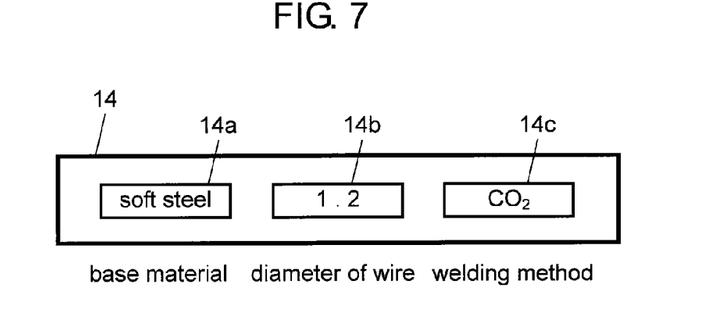
FIG. 7 shows another display section of the setter of the welding device in accordance with the second embodiment.

In this second embodiment, as shown in FIG. 5, display section 5 is formed of LED display devices each having 16 segments; however, LCD 14 as shown in FIG. 7 for displaying multiple contents on one screen can be also used. This LCD 14 is formed of LCD 14a assigned to base material, LCD 14b assigned to diameter of wire, and LCD 14c assigned to welding method, so that LCD 14 displays these three contents at once on one screen. LCD 14 thus can display multiple contents including a warning signal.

The foregoing discussion proves that the second embodiment allows adding or changing the multiple contents of welding condition items without modifying or replacing setter 1. On top of that, if a combination, not performable by welder power supply 8, of the contents of welding condition items is selected, the second embodiment allows issuing a warning signal to setter 1.

Exemplary Embodiment 3

Welding devices available today are equipped with multiple functions in addition to the function of simply selecting a welding method or a base material as described in embodiments 1 and 2. The third embodiment introduces such a multi-function welding device to the present invention. The third embodiment is demonstrated hereinafter with reference to FIG. 8 and FIG. 9. Elements similar to those used in embodiments 1 and 2 have the same reference signs.

Figure 8:
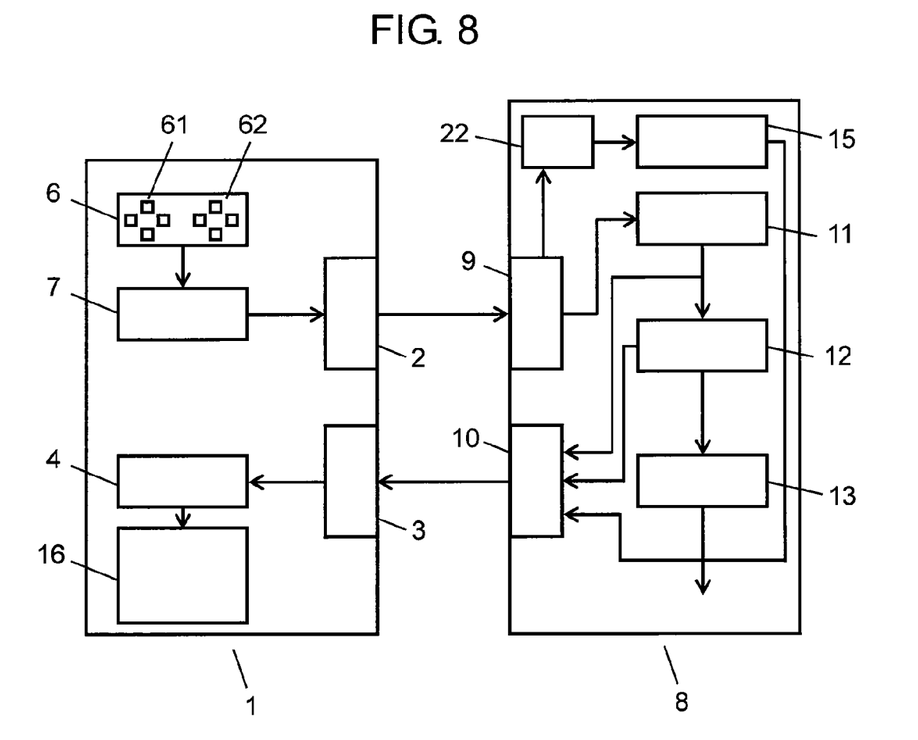
FIG. 8 shows a schematic diagram of a setter and a welder power supply of a welding device in accordance with a third embodiment of the present invention.

FIG. 8 shows a schematic diagram of setter 1 and welder power supply 8 of a welding device in accordance with the third embodiment. A welding output section and other sections related to arc-welding are omitted here as the first embodiment. FIG. 8 differs from the first embodiment in the following three points: (1) Setter 1 adopts dot-matrix display section 16 instead of display section 5 because dot-matrix display section 16 can display various forms such as letter and graph, (2) Setter 1 includes first switch-input section 61 and second switch-input section 62, and (3) welder power supply 8 has a waveform displaying function for display waveforms of a welding current and a welding voltage, and it has also a help function.

First switch-input section 61 selects a function, and is formed of, e.g. a cross key. A press onto an upper section of the cross key allows selecting a function of setting an item of welding condition, which is already described in embodiments 1 and 2. A press onto a right section of the cross key allows selecting the help function, and a press onto a lower section of the cross key allows selecting a function of displaying a current waveform, and a press onto a left section of the cross key allows selecting a function of displaying a voltage waveform.

Second switch-input section 62 is formed of, e.g. a cross key, like the first switch-input section 61, and it sets some condition to the function selected with first switch-input section 61. To be more specific, when a function of setting an item of welding condition is selected by pressing the upper key of first switch-input section 61, multiple contents of the selected item can be designated by pressing second switch-input section 62. For instance, a press on an upper section of the cross key of second switch-input section 62 allows designating MAG welding, and another press on the same section allows designating MIG welding. In a similar way, every press on a right section of the cross key allows designating a base material (aluminum, iron and the like) one by one. Every press on a lower section of the cross key allows designating a diameter of welding wire (1 mm, 1.2 mm and the like) one by one. In other words, the upper section of the cross key of second switch-input section 62 corresponds to switch-input section 6c assigned to welding method as demonstrated in the second embodiment, and the right section thereof corresponds to switch-input section 6a assigned to base material, and the lower section thereof corresponds to switch-input section 6b assigned to diameter of welding wire described in the second embodiment. The contents designated with the cross key of second switch-input section 62 are displayed, like the second embodiment, on dot-matrix display section 16, which allows displaying the contents of three items on one screen like the second embodiment, i.e. welding method, base material, and diameter of welding wire, of the welding condition.

Second switch-input section 62 thus allows designating the contents of the items of welding condition in a similar manner to that of embodiments 1 and 2. The left section of the cross key of second switch-input section 62 is left free for a future use or assigned to another content of an item of welding condition.

In the case that the help function is selected by pressing the right key of first switch-input section 61, a content of the help function can be designated with second switch-input section 62. For instance, a press on the upper or lower section of the cross key of second switch-input section 62 allows selecting a welding method such as MAG welding or MIG welding.

When one of the welding methods is selected by pressing the upper or the lower section of second switch-input section 62, a press on the right or the left section allows selecting know-how about the welding. For instance, when a pulse welding method is selected by pressing the upper or the lower section, a press on the right or the left section allows selecting, e.g. "zero defect", and then "a method for how to avoid defects in the pulse welding" is displayed on dot-matrix display section 16. In other words, a major heading is selected by pressing the upper or the lower section of the cross key of second switch-input section, and a sub-heading of the selected major heading can be selected by pressing the right or the left section of the cross key, whereby a desirable help can be watched on display section 16. The stored know-how about the welding can be thus selected from major headings and then from the sub-headings with a combination of presses on sections of the cross key (combination of upper or lower section with right or left section) of second switch-input section 62.

In the case that the function of displaying a current waveform is selected by pressing the lower section of first switch-input section 61, a standard waveform of the welding method presently selected is displayed on dot-matrix display section 16. In this case, a press on the upper, right, lower, or left section of the cross key of second switch-input section 62 allows displaying a frequency of the welding current, a peak current, or a base current thereof on dot-matrix display section 16, and those contents of the current can be selected to be changed. When the function of displaying a voltage waveform is selected, a similar procedure to what is discussed above can be done to change a content of the voltage.

Welder power supply 8 in accordance with this third embodiment includes the help function, the current waveform displaying function, and the voltage waveform displaying function in addition to the function of setting an item of welding condition which is discussed in the first and second embodiments. Welding device 8 is thus equipped with function memory 15 for storing multiple functional items about the welding as well as function selector 22 for selecting a function or a content of the function from memory 15.

Operations of setter 1 and welder power supply 8 structured as discussed above are demonstrated hereinafter. First, in the case that a content of an item of welding condition is set or changed as it is done in the first and second embodiments, press the upper section of the cross key of first switch-input section 61, thereby generating a signal to be transmitted to setter data receiver 9 of welder power supply 8 via switch data converter 7 and setter data transmitter 2 of setter 1. The signal received at setter data receiver 9 is sent to function selector 22 for selecting the function of setting an item of welding condition among the functions stored in function memory 15. The data of the item setting function selected from memory 15 is transmitted to setter 1 from welder power-supply data transmitter 10. The data transmitted from transmitter 10 is received at welder power-supply data receiver 3 of setter 1, then the data undergoes displayable data converter 4, and then the data is displayed on dot-matrix display section 16 as "setting an item of welding condition". A user watches this display, and presses the upper section of the cross key of second switch-input section 62 for selecting the welding method among the contents of the welding condition items. Every press on the upper section of the cross key of second switch-input section 62 allows designating the content of welding methods one by one. A press on the right section thereof selects a base material, and every press on the right section allows selecting the content of base materials one by one. A press on the lower section of the cross key of second switch-input section 62 selects a diameter of welding wire, and every press on the lower section thereof allows selecting a diameter of welding wires one by one. In other words, a press by the user repeatedly on the upper, right, or left section of the cross key of second switch-input section 62 allows designating a change of the content, assigned to the upper, right, or left section of the cross key, of welding condition item. Dot-matrix display section 16 displays the content of welding condition item according to the designation.

For instance, a press on the upper section of the cross key of second switch-input section 62 selects a welding method, then display section 16 displays, e.g. MAG welding which is a content of welding methods and is firstly stored at a welding method area in welding-condition-item memory & selector 11. Next, if the user wants to change the MAG welding to another method, a press on the upper section of the cross key of second switch-input section 62 allows instructing a change in the content. Every press on the upper section of the cross key allows an increment in the indexes of welding-condition-item memory & selector 11 one by one. This mechanism, similar to that of embodiment 1 or 2, allows selecting a content of welding condition item one by one stored in memory & selector 11. The data of the selected content is transmitted from welder power-supply data transmitter 10 to setter 1. The data is received at welder power-supply data receiver 3, and the data undergoes displayable data converter 4, and the data is finally displayed on dot-matrix display section 16. For instance, in the case that MIG welding is stored at the second place in memory & selector 11, one press on the upper section of the cross key of second switch-input section 62 prompts display section 16 to display "MIG welding" for the user to acknowledge that MIG welding is selected. Setter 1 and welder power supply 8 thus perform in a similar way to those demonstrated in the first and the second embodiments.

Next, in the case that a wire diameter is selected by pressing the lower section of the cross key of second switch-input section 62, display section 16 displays the welding condition item firstly stored in an area of wire diameter in memory & selector 11, i.e. the content of the wire diameter, for instance, 1.0 mm. Then if the user wants to change the wire diameter, the user presses twice the lower section of the cross key of switch-input section 62, thereby instructing the index of the content to increase in two steps, and the wire diameter of, e.g. 1.4 mm is selected. The data of the selected wire diameter 1.4 mm is transmitted from welder power-supply data transmitter 10 to setter 1. The data is received by setter 1 at welder power-supply data receiver 3 and undergoes displayable data converter 4, then the data is displayed as "1.4 mm" on display section 16 for acknowledging the change of the wire diameter. At this time, dot-matrix display section 16 also displays "MIG welding" previously instructed. Every instructed item of welding condition is thus acknowledged on one display section as the second embodiment does.

The welding condition items, i.e. MIG welding and 1.4 mm wire diameter, are thus selected, then welding condition selector 12 search welding condition memory 13 for specific predetermined welding condition data fit for the "MIG welding with 1.4 mm wire diameter". For instance, selector 12 searches and selects a condition data performable by the welder, e.g. a welding waveform parameter such as a rising time of the current waveform. The selected data is sent to the welder, which then carries out the welding based on this data.

In the case that the welder cannot weld with the wire having 1.4 mm diameter, the combination of the items discussed above is not stored in memory 13. In this case, welding condition selector 12 transmits a warning signal from welder power-supply data transmitter 10 to setter 1, which receives the warning signal at welder power-supply data receiver 3 and sends the signal to displayable data converter 4, and then the signal is displayed by, e.g. blinking, on display section 16 in order to warn the user. The user acknowledges this warning, and then presses the upper section of the cross key of second switch-input section 62 for changing the welding method, i.e. a content of one of items, or presses the lower section of the cross key thereof for changing the wire diameter, or presses the right section of the cross key for selecting and changing the base material, i.e. one of items of welding condition. Thus another combination performable by the welder is selected for carrying out the welding.

In this third embodiment, assume that the welder is replaced with another one, and a program for the welding condition is altered in welder power supply 8, whereby the content of the welding condition item and the data of welding condition are changed. In this case, there is no need to replace setter 1, and items of the welding condition can be set through the presently-used setter 1. For instance, in the case that $Co_2$ welding method is available as a content of the welding method in addition to MAG welding and MIG welding, the program is altered to permit using the $Co_2$ welding, and the data of welding condition to permit using the $Co_2$ welding is stored in welding condition memory 13. In such a case, the presently used setter 1 can be still used for changing and designating the content of a welding condition item by pressing the upper section of the cross key of second switch-input section 62. In the case that welder power supply 8 changes a base material or a wire diameter, the content corresponding to this change can be changed and designated by pressing the right section or the lower section of the cross key of second switch-input section 62. The combination of the contents of welding condition performable by the welder can be thus selected without replacing the presently used setter 1.

This third embodiment, as previously discussed, allows the user to press the right section of the cross key of first switch-input section 61 in order to select the help function, and to press the lower section of the cross key thereof to select the current waveform displaying function, and to press the left section to select the voltage waveform displaying section.

The help function is firstly detailed hereinafter. The data indicating that the right section of the cross key of first switch-input section 61 is pressed is transmitted from setter data transmitter 2 to welder power supply 8 via switch data converter 7. Welder power supply 8 receives this data at setter data receiver 9 and transmits it to function selector 22, thereby selecting the help function among the functions stored in function memory 15. The data of the help function selected is transmitted from welder power-supply data transmitter 10 to setter 1, which receives this data at receiver 3 and sends the data to displayable data converter 4 for displaying "help function" on display section 16. The user acknowledges this display and presses the upper or the lower section of the cross key of second switch-input section 62 to select a major heading of the help function. The major headings include MIG welding, MAG welding, $Co_2$ welding, as welding methods. An item selected among the major headings by pressing the upper or lower section of the cross key of second switch-input selection 62 is displayed on display section 16 via data transmitter 10 and data receiver 3. The user acknowledges this display, and then presses the right or left section of the cross key of second switch-input section 62 to sequentially change the subheadings of the major heading for selecting the subheading. The data of the subheading selected is transmitted from welder power-supply data transmitter 10 to data receiver 3, and is displayed on display section 16, so that the user can acknowledge specific measures against the present situation.

For instance, to press the right or left section of the cross key allows selecting the know-how of welding such as "zero defects in welding" or "welding a variety of joints". The press onto the upper or lower section of the cross key of second switch-input section 62 thus allows selecting "MAG welding" as a major heading, and the press onto the right or left section thereof allows selecting "zero defects in welding", then dot-matrix display section 16 displays the method for "zero defects in MAG welding".

Figure 9:
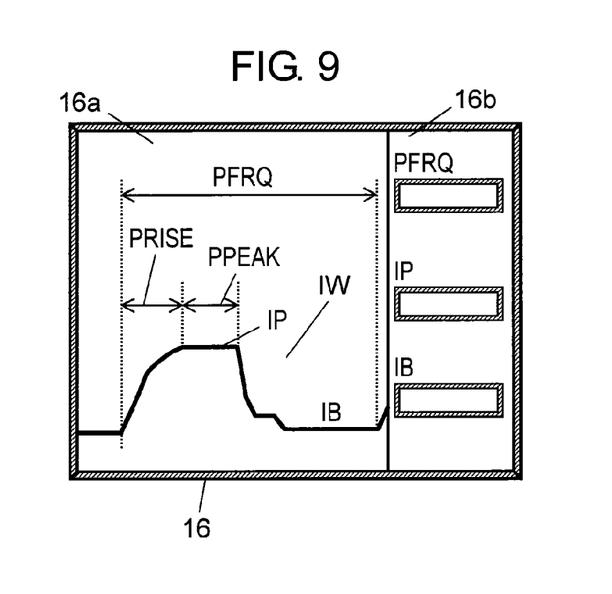
FIG. 9 shows a display example of the welding device in accordance with the third embodiment.

Next, the current waveform displaying function is described hereinafter. A press onto the lower section of first switch-input section 61 allows selecting this function, and then the data about this function is transmitted from setter data transmitter 2 to function selector 22 via setter-data receiver 9. This procedure allows display section 16 to display a standard current waveform of the welding method presently selected and stored in function memory 15. FIG. 9 shows an example of dot-matrix display section 16 in accordance with the third embodiment. In FIG. 9, wave form display area 16a of dot-matrix display section 16 displays, e.g. pulse-like standard current waveform IW to be used in the pulse welding. Standard waveform IW shows the locations of the following elements of the current waveform: pulse frequency PFRQ, rising time PRISE, peak period PPEAK, peak current IP, base current IB. Among those elements, a specific value of pulse frequency PRQ, peak current IP, and base current IB is displayed on each display window, assigned to PFRQ, IP, and IB respectively, of element display area 16b. Then a press onto the upper or lower section of the cross key of second switch-input section 62 allows scrolling upward or downward the display windows, assigned to each element of the current waveform, in element display area 16b, thereby highlighting display windows assigned to other current waveform elements, e.g. rise time PRISE, peak period PPEAK. In this case, the elements can be changed by inputting numerals through numeral keys provided to setter 1. In other words, the press onto the upper section or lower section of second switch-input section 62 allows the display windows, where desirable current-waveform elements are to be displayed, to scroll upward or downward, thereby selecting a display window assigned to a desirable current-waveform element. Then the element is changed with the numeral keys. This change allows replacing the current waveform presently displayed with current waveform IW in accordance with the element now changed. The user can thus watch desirable current waveform IW with ease.

Next, a press onto the left section of first switch-input section 61 allows selecting the voltage waveform displaying function. When this function is selected, the procedure thereafter is similar to that of selecting the current waveform displaying function, so that the description thereof is omitted here.

As discussed above, the third embodiment proves that a manipulation of the cross key of first switch-input section 61 allows selecting a function among such functions as welding-condition-item selecting function, help function, current waveform displaying function. The selected function is transmitted to function selector 22, and the data corresponding to the selected function and selected from function memory 15 is displayed dot-matrix display section 16. When the welding-condition-item selecting function is selected, a content of the item of welding condition is selected by welding-condition-item memory & selector 11, and welding condition selector 12 searches welding condition memory 13 for specific data of the welding condition. This mechanism allows changing a content of the item of welding condition without replacing setter 1.

Exemplary Embodiment 4

When a current or a voltage as a content of welding condition item is changed, a user can input an amount to be changed into setter 1 in accordance with the fourth embodiment. Setter 1 thus includes this input function in addition to the functions described in the first embodiment. The fourth embodiment is detailed hereinafter with reference to FIG. 10, and structural elements similar to those used in embodiments 1-3 have the same reference signs, and the descriptions thereof are omitted here.

Figure 10:
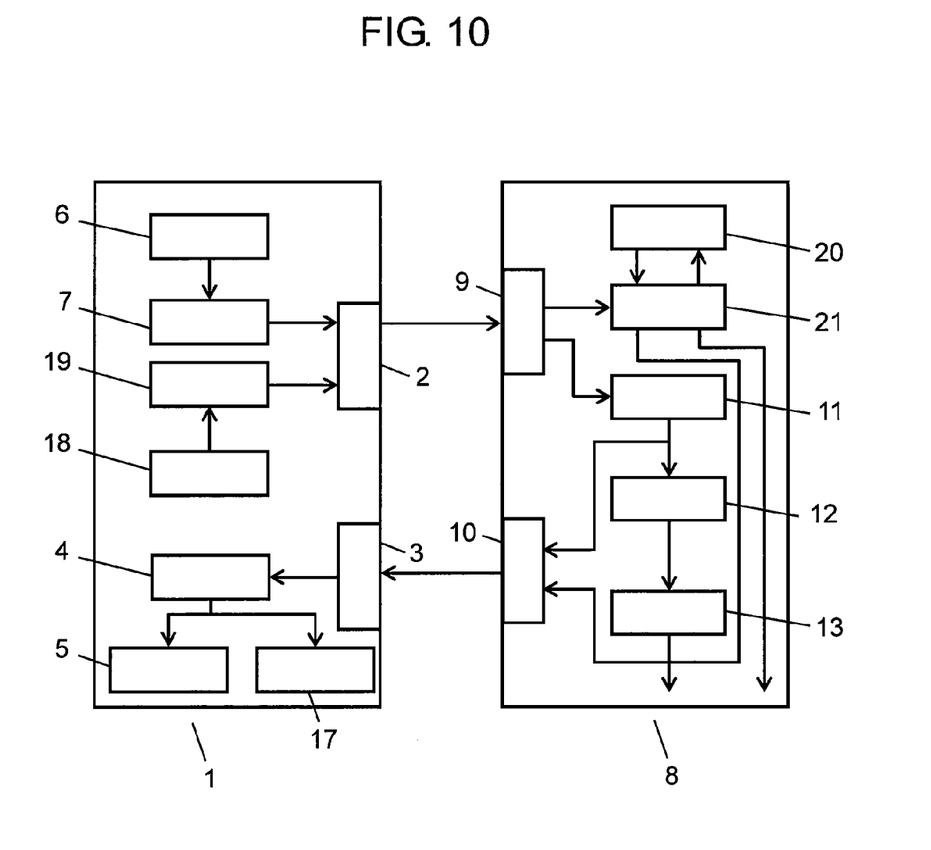
FIG. 10 shows a schematic diagram of a setter and a welder power supply of a welding device in accordance with a fourth embodiment of the present invention.

FIG. 10 shows a schematic diagram of setter 1 and welder power supply 8 forming a welding device in accordance with the fourth embodiment. Sections, such as a welding output section, related to the arc welding are omitted as embodiments 1-3 omit them from the drawings.

This fourth embodiment uses a structure similar to that used in the first embodiment. To be more specific, setter 1 is formed of setter data transmitter 2, welder power-supply data receiver 3, displayable data converter 4, display section 5, switch-input section 6, and switch data converter 7. Welder power supply 8 is formed of setter data receiver 9, welder power-supply data transmitter 10, welding-condition-item memory & selector 11, welding condition selector 12, and welding condition memory 13.

As shown in FIG. 10, setter 1 includes current/voltage display section 17 which displays a current or a voltage as a content of an item of welding condition, and current/voltage change section 18 through which a user can input an amount to be changed from the current or the voltage displayed on display section 17. Setter 1 further includes converter 19 for converting an amount to be changed from a set current/voltage into data to be transmittable to welder power supply 8. Current/voltage display section 17 can be formed of two display sections assigned to the display of current and the display of voltage, or one LCD screen for displaying both of the current and the voltage on the one screen. Current/voltage change section 18 can be formed of two sections for changing a current and changing a voltage, or one section for both of a current and a voltage. A jog dial or a variable resistor is an instance of current/voltage change section 18. The jog dial employs a rotary encoder which can change the amount discretely, and the variable resistor can change the amount analogically. The current or the voltage displayed on current/voltage display section 17 is called a set current or a set voltage which is a target value for welder power supply 8 to operate. This fourth embodiment features a function of changing this set current or set voltage.

Welder power supply 8 includes current/voltage memory 20 which stores a current or a voltage that will be a reference value proper to welder power supply 8 and a current or a voltage calculated by current/voltage determiner 21 which is detailed later. Welder power supply 8 also includes current/voltage determiner 21 that calculates and newly determines a current or a voltage based on the transmitted data about the change amount and the reference current or the reference voltage stored in current/voltage memory 20.

In other words, this fourth embodiment differs from the first one in the following two points: (1) Setter 1 additionally includes current/voltage display section 17, current/voltage change section 18, and converter 19 for converting an amount to be changed from a set current/voltage into data. (2) Welder power supply 8 additionally includes current/voltage memory 20 and current/voltage determiner 21.

The operations of setter 1 and welder power supply 8 are demonstrated hereinafter. A start-up operation, a selection and a display of a content of welding condition item are similar to those done in the first embodiment. Setter 1 in accordance with this fourth embodiment allows current/voltage change section 18 to determine an amount to be changed from the current or the voltage presently displayed on current/voltage display section 17, and allows current/voltage change-amount converter 19 to convert the change-amount into the data before the data is transmitted to welder power supply 8 from setter-data transmitter 2.

Current/voltage determiner 21 of welder power supply 8 calculates a new current or a new voltage based on the data received at setter-data receiver 9 and the reference current or the reference voltage stored in current/voltage memory 20.

Use of a jog dial, which can discretely change an amount to be changed, as current/voltage changing section 18 to change a current value is demonstrated hereinafter. Assume that a turn of the jog dial clockwise by one pitch increases a current by 1 A, and a turn thereof counterclockwise by one pitch decreases the current by 1 A. Assume that the reference current stored in current/voltage memory 20 of welder power supply 8 is 100 A.

In the start-up status, the data of reference current 100 A stored in current/voltage memory 20 is transmitted as the information about the current from welder power-supply data transmitter 10 of welder power supply 8 to setter 1. Setter 1 receives the data of reference current 100 A at welder power-supply data receiver 3, and current/voltage display section 17 displays "100 A". Assume that the user turns the jog dial, working as current/voltage changing section 18, clockwise by one pitch, and then a signal indicating that the jog dial is turned clockwise by one pitch is transmitted as the data of a change in the current from setter-data transmitter 2 of setter 1 to welder power supply 8. This signal is received by current/voltage determiner 21 of welder power supply 8 via setter-data receiver 9, and determiner 21 calculates to obtain 101 A based on the reference current 100 A and 1 A corresponding to the turn of the jog dial clockwise by one pitch. Welder power supply 8 then stores the result of 101 A in current/voltage memory 20 as well as transmits the result as data to be displayed from welder power-supply data transmitter 10 to setter 1. As a result, current/voltage display section 17 of setter 1 displays "101 A".

The jog dial is further turned clockwise by another one pitch, then welder power supply 8 adds current value 101 A stored in memory 20 to current value 1 A corresponding to this another one pitch, and stores the result of 102 A in memory 20. Display 17 of setter 1 displays "102 A". The current value to be referenced in calculating can be thus changed anytime. When welder power supply 8 is halted, and re-booted up, the latest value (102 A in this case) stored in memory 20 becomes the reference value for the calculation.

A current value or a voltage value corresponding to the action of turning the jog dial clockwise by one pitch can be varied depending on a rated output capacity of welder power supply 8 so that the current value or the voltage value can be changed with ease. The current value is taken as an example for describing this mechanism. Assume that the rated output capacity of welder power supply 8 is 500 A, and a turn of the jog dial clockwise by one pitch causes a change in current value by 1 A (reference value). In this case, assume that the coefficient is 1 (one) with respect to the rated output capacity 500 A. The turn of the jog dial by one pitch clockwise thus corresponds to 1 A×1=1 A. Assume that the rated output capacity is changed to 350 A because a base material of a target object or a wire diameter is changed, and assume that the coefficient with respect to 350 A is 0.7, then the turn of the jog dial by one pitch clockwise corresponds to 0.7 A (1 A×0.7=0.7 A.) This coefficient can be set by manual operation or automatic calculation in a memory (not shown) of welder power supply 8 when the rated output capacity is changed. In the case of the automatic calculation, the coefficient can be calculated by using a ratio of 500 A vs. a changed rated-output-capacity. Thus when welder power supply 8 uses different rated output capacities, a current value corresponding to the turn of the jog dial by one pitch clockwise can be uniquely defined by welder power supply 8 through changing the coefficient. In the case that welder power supply 8 changes its rated output capacity, there is thus no need to modify or replace setter 1 presently used. Use of the present setter 1 still allows setting a condition of a current value in response to the changed rated-output-capacity of welder power supply 8.

A welding output of welder power supply 8 can be controlled by the current value or the voltage value calculated by current/voltage determiner 21 and stored in current/voltage memory 20. Those values are used as a set current or a set voltage.

As discussed above, setter 1 in accordance with the fourth embodiment includes current/voltage changing section 18 which has the function of designating an amount to be changed from the set current or the set voltage. This function of setting a current or a voltage to setter 1 is added to setter 1 in accordance with the first embodiment. This additional function allows setter 1 in accordance with the fourth embodiment to set a current or a voltage by simply changing a coefficient to be used at a calculation in current/voltage determiner 21. The calculation is done for adapting the current value or the voltage value to the rated output capacity of welder power supply 8. There is thus no need to modify or replace setter 1 presently used for setting a current or a voltage in response to an output capacity of welder power supply 8.

In the welding device in accordance with this fourth embodiment, setter 1 does not transmit an absolute welding current to welder power supply 8, but it transmits the data of an amount to be changed from a set welding current. Welder power supply 8 calculates a welding current value (e.g. 110 A) based on a reference current value (e.g. 100 A) stored in current/voltage memory 20 and the data of an amount to be changed (e.g. +10 A) transmitted from setter 1, and carries out the welding with this welding current (110 A). At the same time, welder power supply 8 transmits this welding current value (e.g. 110 A) to setter 1, which then displays "110 A" on current/voltage display section 17. The welding device in accordance with the fourth embodiment allows displaying an actually-used welding current on setter 1 so that an operator can watch the current presently used.

Although a conventional welding device sometimes encounters malfunction when a welding current is input into its setter, the welding device in accordance with the fourth embodiment can prevent the malfunction. To be more specific, in the case that the welding current is changed from 100 A to 110 A, if this information is not correctly transmitted to welder power supply 8 although an operator recognizes that 110 A is to be used for welding, the malfunction caused by the use of 100 A instead of 110 A can be prevented.

The structure of the third embodiment previously discussed can be combined with current/voltage display section 17, current/voltage changing section 18, converter 19 for converting an amount to be changed from a set current/voltage into data, current/voltage memory 20, and current/voltage determiner 21, whereby the welding device in accordance with this fourth embodiment can be achieved. This structure allows using a new function added to welder power supply 8.

Current/voltage changing section 18 can be used in order to determine a change of, e.g. a parameter for controlling a waveform, besides to change the set current or the set voltage.

The embodiments discussed above use LED display device 51 and LCD display device 14 as display section 5, and those display devices employ 16 segments/letter; however, the present invention is not limited these examples, for instance, any display element, such as organic EL display device, can be selected appropriately to a purpose of display.

INDUSTRIAL APPLICABILITY

The present invention eliminates a need of modifying or replacing a setter of a welding device even if a content of a welding condition item is changed, so that an alteration in the welding device can be smoothly introduced at production site. The present invention is thus useful for welding devices in which the setter sets a condition of a welder power supply.

The invention claimed is:

1. A welding device comprising:
   a welder power supply; and
   a setter for setting a welding condition item to the welder power supply, wherein the welder power supply produces an output which powers a welder and which depends upon said welding condition item which is set by the setter
   wherein the setter includes:
   a change instruction input section for inputting an instruction that changes a content of the welding condition item in the welder power supply so that said output of said power supply changes;
   a setter-data transmitter for transmitting the instruction, to the welder power supply;
   a welder power-supply data receiver for receiving the content of the welding condition item transmitted from the welder power supply; and
   a display section for displaying the content of the welding condition item received at the welder power-supply data receiver,
   wherein the welder power supply includes:
   a setter-data receiver for receiving the instruction transmitted from the setter;
   a welding-condition-item memory & selector, connected to the setter-data receiver, for storing a plurality of contents of the welding condition item and for selecting the content from the plurality of contents of the welding condition item based on the instruction and independent of the other plurality of contents, stored in the welding-condition-item memory and selector;
   a welding condition memory for storing data corresponding to the content of the welding condition item; and
   a welder power-supply data transmitter for transmitting the content of the welding condition item to the setter, where the content is selected by the welding-condition-item memory & selector;
   wherein the display section of the setter displays the content of the welding condition item, selected by the welding-condition-item memory & selector.

2. The welding device of claim 1, wherein the change instruction input section can input information of a change instruction that requests a change of respective contents of a plurality of the welding condition items, and the display section allows displaying each one of the contents of the respective welding condition items, and the welding-condition-item memory & selector allows storing each one of the contents of the respective welding condition items and selecting each one of the contents of the respective welding condition items based on the change instructions of the respective welding condition items.

3. The welding device of claim 2, wherein the welding condition memory stores data of the welding condition, corresponding to a combination of contents of the welding condition items performable by the welder,
   wherein the welding device includes a welding condition selector that determines whether the welding condition memory stores the combination of the contents of the welding condition items, which contents are selected by the welding-condition-item memory & selector, and when a wrong combination of contents, selected by the welding-condition-item memory & selector, and whose corresponding data is not stored in the welding condition memory, the welding condition selector transmits a warning information, which warns a user of the wrong combination of the contents of the welding condition items, to the welder power-supply data transmitter, and
   wherein the display section of the setter displays information about the wrong combination of the contents of the welding condition items based on the warning information.

4. The welding device of claim 1, wherein the welder power supply includes a function memory for storing a plurality of function items about welding, and a function selector for selecting one of the function items stored in the function memory, and
   wherein the display section of the setter displays the function item selected by the function selector and transmitted from the welder power supply.

5. The welding device of claim 1, wherein the setter includes a current/voltage changing section that determines an amount to be changed from at least one of a current value and a voltage value,
   wherein the welder power supply includes a current/voltage memory that stores a reference value of at least one of the current value and the voltage value, and a current/voltage determiner that calculates and determines at least one of a new current value and a new voltage value based on the amount transmitted from the setter and the reference value stored in the current/voltage memory, and
   wherein the display section of the setter displays at least one of the current value and the voltage value determined by the current/voltage determiner and transmitted from the welder power supply.

6. The welding device of claim 1, wherein the welding condition item includes at least one of a welding method, a base material, and a diameter of a welding wire.

7. A setter of a welding device, the setter comprising:
   a change instruction input section through which information of an instruction that changes a content of a welding condition item is inputted;
   a setter-data transmitter for transmitting the instruction, to a welder power supply;
   a welder power-supply data receiver for receiving the content of the welding condition item transmitted from the welder power supply; and
   a display section for displaying the content of the welding condition item received at the welder power-supply data receiver,
   wherein the setter data transmitter transmits the information of the instruction to the welder power supply that comprises:
   a setter-data receiver for receiving the information of change instruction transmitted from the setter;
   a welding-condition-item memory & selector, connected to the setter-data receiver, for storing a plurality of contents of the welding condition item and for selecting the content from the plurality of contents of the welding condition item based on the instruction and independent of the other plurality of contents, stored in the welding-condition-item memory and selector; and
   a welder power-supply data transmitter for transmitting the content of the welding condition item, selected by the welding-condition-item memory & selector, to a welder power-supply data receiver,
   wherein the welder power-supply data receiver receives the content of the welding condition item, selected by the welding-condition-item memory & selector and transmitted from the welder power supply, and
   wherein the display section displays the content of the welding condition item, selected by the memory & selector.

8. The welding device of claim 1, wherein a repeated input of the instruction from the change instruction input section of the setter allows a change of the content of the welding-condition-item selected by the welding-condition-item memory & selector of the welder power supply repeatedly and sequentially, the data of a welding condition of the welder power supply is selected based on the content of the welding-condition-item selected by the welding-condition-item memory & selector, and the content of the welding-condition-item selected by the welding-condition-item memory & selector is displayed on the display section of the setter.

9. The welding device of claim 1, wherein the welding-condition-item includes at least one of a welding method, a diameter of a welding wire, and a base material, wherein the content of the welding method includes MAG welding and MIG welding, the content of the diameter includes a specific numeral of the wire diameter, and the content of the base material includes a material name.

10. The welding device of claim 9 further comprising:
   a welding condition selector which searches data of the welding condition corresponding to the selected welding-condition-item from the welding condition memory,
   wherein the welding-condition-item includes the welding method, the diameter and the base material, and if the data of a welding condition corresponding to the combination of the welding method, the diameter and the base material, which are selected by the welding-condition-item memory & selector, is not stored in the welding condition memory, the welding condition selector transmits a warning information to the setter.

* * * * *

UNITED STATES PATENT AND TRADEMARK OFFICE
CERTIFICATE OF CORRECTION

PATENT NO. : 8,309,886 B2
APPLICATION NO. : 12/598046
DATED : November 13, 2012
INVENTOR(S) : Hideki Ihara et al.

It is certified that error appears in the above-identified patent and that said Letters Patent is hereby corrected as shown below:

On the Title Page, Item [56], References Cited FOREIGN PATENT DOCUMENTS, please delete the following duplicate references:

"JP   11047950        2/1999
 JP   2007222883      9/2007"

Signed and Sealed this
Second Day of April, 2013

Teresa Stanek Rea
*Acting Director of the United States Patent and Trademark Office*